Patented July 16, 1940

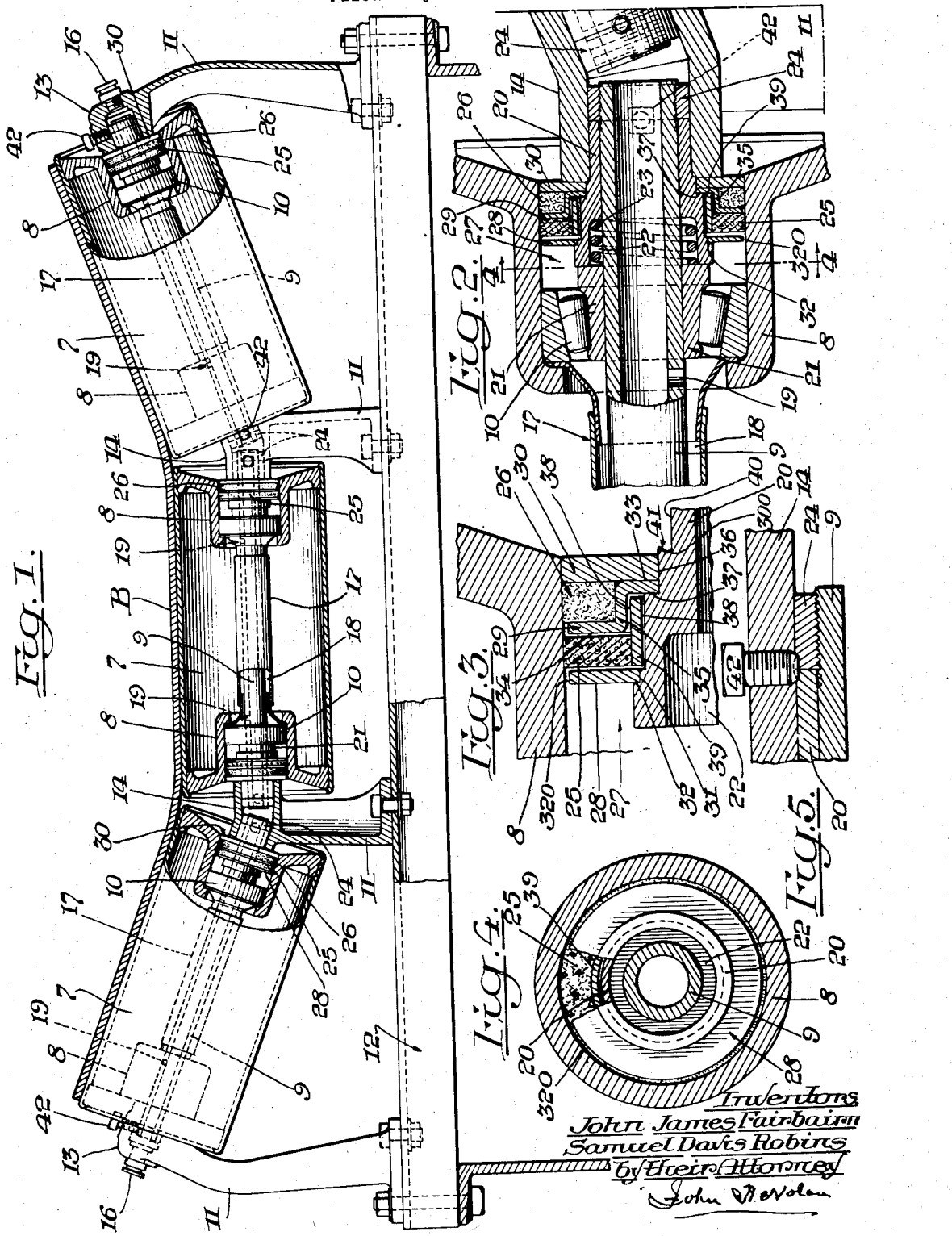

2,207,790

UNITED STATES PATENT OFFICE 2,207,790

IDLER ROLL

John James Fairbairn, Roosevelt, and Samuel Davis Robins, Hewlett, N. Y., assignors to Robins Conveying Belt Company, Passaic, N. J., a corporation of New Jersey Application July 12, 1939, Serial No. 283,932

6 Claims. (Cl. 308—20)

This invention relates to idler rolls and the like, such, for example, as are used in connection with belt conveyers. More particularly the invention has reference to certain improvements in the idler roll construction set out in Letters Patent of the United States No. 1,958,412, dated May 15, 1934.

An object of our invention is to provide a simple yet efficient lubricant seal which can be readily applied to or removed from the roll assembly without the use of special tools.

Another object of the invention is the provision of novel and efficient adjusting and locking means for the bearing seal and associated parts.

With these objects and others in view the invention comprises features of novelty which will be hereinafter described, the scope of the invention being expressed in the appended claims.

In the drawing—

Figure 1 is a sectional elevation of a troughing idler structure embodying our improvements.

Fig. 2 is a section of a portion of one end of a roll, showing the valvular member of the seal in closing position.

Fig. 3 is a view of a portion of the seal assembly, showing the said member in its normal or open position.

Fig. 4 is a transverse section, as on the line 4—4 of Fig. 2.

Fig. 5 is a sectional detail of the adjusting and locking means.

Referring to the drawing, 7 designates a series of associated rolls, in the present instance three, arranged in angular relation to each other to afford a troughing idler for a conveyer belt, as B. The rolls have inwardly extending end hubs or bearing supports 8 which are rotatably mounted on fixed tubular shafts 9 and are each provided with suitable anti-friction bearings 10. The ends of the shafts are fixedly supported by bosses formed on suitably-spaced brackets 11 rising from the bed 12 of the idler structure, the bosses 13, of the outermost brackets being bored to receive the outer ends of the shafts of the respective outer rolls, and the bosses 14, of the intervening brackets being bored to receive the respective ends of the middle shaft and also the adjacent ends of the outer shafts, thus affording direct internal communication of the respective shafts. The outermost brackets 11 are respectively provided with valveless nipples 16, to either of which a suitable "grease gun" can be applied and manipulated to force grease or other appropriate lubricant into and through the associated shafts.

Encircling each of the shafts in the space between the hubs of the roll thereon is a tubular casing 17 which, in conjunction with the shaft, affords an annular lubricant chamber 18 communicating at its ends with the interior of the respective hubs. The chamber 18 also communicates with the interior of the shaft through orifices 19 formed in the wall of the shaft adjacent the respective hubs of the roll and the inner sides of the bearings. Hence when lubricant is forced through either of the nipples 16 into the proximate shaft such lubricant passes through the orifices 19 of the shaft and into and through the respective bearings 10.

Mounted on the shaft of each roll, adjacent the ends thereof and beyond the opposite sides of the bearings, are grease seals each of which includes a retainer for an annular valve which is movable laterally into and out of sealing relation to the retainer. The valve is moved and held by the pressure thereagainst of the lubricant during its forcible charging into the bearing support, being returnable to its previous position when the charging pressure is relieved.

The construction thus far described is substantially the same as disclosed in the prior patent referred to, excepting as to the seal assemblies. According to our invention each assembly comprises a sleeve 20 which is mounted for longitudinal adjustment on an end portion of the shaft 9 within the adjacent hub 8 and bracket boss 13 or 14. The inner end of the sleeve, which is in close relation to the fixed inner member 21 of the proximate anti-friction bearing, is recessed, as at 22, to receive a compression spring 23 which tends to urge the sleeve outward from the bearing, and in opposition to an adjusting collar 24 which is threaded on the outer end of the shaft and is locked in position, as will presently appear.

The seal assembly embodies two washers 25 and 26, of expansible material preferably cork and felt, respectively, the former constituting a valve member and the latter a packing ring. These washers are supported in adjacent annular chambers formed and arranged within the outer end portion of the space 27 between the sleeve 20 and the inner wall of the adjacent hub 8. The chambers are formed by metal washers 28, 29 and 30 which are fixed on the sleeve 20 in spaced parallel relation. The washer 28 tightly encircles a reduced portion 31 of the sleeve and abuts a shoulder 32 on the latter, the periphery of the washer being slightly spaced from the inner wall of the hub, as at 320. The washer 29 is of angular formation in cross-section to afford offset inner and outer vertical members 33 and 34, respectively, and a horizontal connecting member 35. The inner member 33 is fitted on a reduced peripheral portion 36 of the sleeve 20 and in abutting relation to the adjacent shoulder 37, and the horizontal member 35 is spaced from the periphery of the sleeve to afford between them an annular guide channel 38. The washer 30, with which the end of the roll has a running fit, is slipped on the reduced portion 36 of the sleeve and fastened thereon hard against the inner member of the washer 29.

Preceding the application of the washer 29 to the sleeve 20 a metal ring 39 to which the valve member 25 is firmly secured is slipped on such sleeve and in proximity to the washer 29, which ring when the angular washer 29 is applied, is rotatable on and slidable longitudinally of the sleeve and within the guide channel 38, the valve member being loosely fitted in the annular chamber between the washers 28 and 29. Then, preceding the application of the locking washer 30, the packing member 26 is applied to the outer portion of the angular washer 29 and against the inner opposing wall of the roll hub. Hence when the washer 30 is applied and fastened to the sleeve 20 the washer 29 is locked to the sleeve and the packing member is rotatably supported, thus providing within the roll hub a unitary labyrinth seal for the bearing.

As a simple and efficient means to fasten the locking washer 30 in place a shoulder 300 formed by the outer reduced end 40 of the sleeve 20, is undercut to produce an annular lip 41 (Fig. 3) at the adjacent outer edge of the washer 30, and, when the elements of the seal have been assembled as just described, the lip is driven inward in a manner to force the metal of the sleeve 20 hard against the contiguous inner edge of the washer 30.

From the foregoing it will be seen that our invention provides a unitary seal readily attachable to or detachable from the shaft and roll assembly, which seal includes a valvular element laterally movable to sealing position by the charging pressure of the lubricant, yet concurrently rotatable by and with the roll, and which seal also includes a similarly rotatable packing element which precludes the entrance of grit or similar foreign material to the valve chamber. It will also be seen that the freely rotatable and slidable ring 39 carrying the valve member 25 ensures the efficient contact of the latter with the rotating element 8 when the member is peripherally expanded by the lateral pressure thereagainst of the lubricant during the charging operation, and this without the said member exerting frictional resistance against the stationary element. See Fig. 2.

In the present instance the adjustment of the sleeve 20, together with its associated elements, in respect to the anti-friction bearing, is effected by means of the screw collar 24 which abuts the outer end of said sleeve. This collar, as well as the sleeve, is securely held in adjusted position against the pressure of the spring 23 by means of a single set screw 42 which is fitted in a tapped radial hole in the boss of the adjacent bracket 11 so as to clamp the abutting end portions of the collar and sleeve, thus not only preventing the creeping and rotation of these elements during the operation of the roll, but also securely holding the end of the shaft in place. Since the ends of the series of shafts, together with the collars 24, and sleeves 20 are secured by the radial screws 42 to the bosses of the respective brackets 11, a rigid truss structure or mounting for the rolls is provided, and therefore when a load is on the belt there is no liability of deflection of the supporting members.

We claim—

1. A valvular lubricant seal for bearings between stationary and rotatable elements, comprising annular walls in fixed relation to the stationary element and providing between them a circular valve chamber, a rotatable and laterally slidable ring forming the bottom of said chamber, and an annular valve member of expansible material fixed to and movable with said ring, said member located within and of less width than the chamber and movable to close sealing relation with one of said walls by contact of the lubricant against said member and then held by the pressure of the lubricant during the forcible charging of the bearing with lubricant.

2. A valvular lubricant seal for bearings between stationary and rotatable elements, comprising annular walls between which a circular valve chamber is provided, one of which walls is in fixed relation to the stationary element and the other of which walls is detachably mounted, means for securing the detachable wall in spaced parallel relation to the fixed wall, a rotatable and laterally slidable ring forming the bottom of the chamber, and an annular valve member of expansible material fixed to and movable with said ring, said member located within and of less width than the said chamber and movable to close sealing relation with one of said walls by contact of the lubricant against said member and then held by the pressure of the lubricant during the forcible charging of the bearing with lubricant.

3. A valvular lubricant seal for bearings between stationary and rotatable elements, comprising annular walls in fixed relation to the stationary element and providing between them a circular valve chamber, one of which walls is in fixed relation to the stationary element and the other of which walls is detachably mounted, a rotatable and laterally slidable ring forming the bottom of said chamber, an annular valve member of expansible material fixed to and movable with said ring, said valve element located within and of less width than the said chamber, and movable to close sealing relation with one of said walls by contact of the lubricant against said member and then held by the pressure of the lubricant during the forcible charging of the bearing with lubricant, a locking member for said detachable wall in fixed relation to said stationary element, and packing material interposed between said locking member and the detachable wall.

4. A rotatable element having a central bearing support, a stationary shaft co-axial with said support, an anti-friction bearing located between said shaft and support and arranged to be supplied with lubricant introduced under pressure laterally of the bearing, a sleeve detachably mounted on said shaft, spaced washers arranged on said sleeve to partition the space between the sleeve and the bearing support and thus provide two adjacent circular chambers, a valve ring mounted to rotate in the chamber adjacent the bearing, and packing material arranged within the other chamber, the washer adjacent the bearing being in fixed relation to the sleeve, the next washer being slid on the sleeve and the next or outer washer being fixed on the sleeve in clamping relation to the second-named washer.

5. A rotatable element having a central bearing support, a stationary shaft co-axial with said support, an anti-friction bearing located between said shaft and support and arranged to be supplied with lubricant introduced under pressure laterally of the bearing, a sleeve detachably mounted on said shaft, spaced washers encircling said sleeve to partition the space between the sleeve and the bearing support and thus provide two circular chambers, an annular valve mounted to rotate in the chamber adjacent the bearing, a base ring for said valve rotatably mounted at the bottom of said chamber, and packing material arranged within the other chamber, the washer adjacent the bearing being in fixed relation to the sleeve, the next washer being of angular or offset formation in cross-section with its inner portion offset and slid on the sleeve thus providing an annular guideway for the said base ring, and the next or outer washer being fixed on the sleeve in clamping relation to the offset portion of the second washer.

6. A troughing idler construction comprising a series of shafts arranged end to end and in angular relation to each other, brackets having supports for the ends of the respective shafts, idler rolls mounted to rotate on the respective shafts, each roll having a hub portion through which the complementary shaft extends, an anti-friction bearing located between each shaft and the adjacent roll hub and arranged to be supplied with lubricant introduced laterally of the bearing, a sleeve mounted on each shaft and having one end in proximity to the bearing, an adjusting collar on the shaft in position to abut the opposite end of the sleeve, and a radial set screw threaded in the adjacent bracket support so as to bear against said collar and the opposing end portion of the sleeve.

JOHN JAMES FAIRBAIRN.
SAMUEL DAVIS ROBINS.